United States Patent
Dreher

(10) Patent No.: US 9,931,659 B2
(45) Date of Patent: Apr. 3, 2018

(54) ROBOT TOOL AND ROBOT FOR DISPENSING AN ANTICORROSION WAX, AND METHOD THEREFOR

(71) Applicant: Claus Dreher, Xaghra (MT)

(72) Inventor: Claus Dreher, Xaghra (MT)

(73) Assignee: IPR—INTELLIGENTE PERIPHERIEN FUER ROBOTER GMBH, Eppingen (DE)

( * ) Notice: Subject to any disclaimer, the term of this patent is extended or adjusted under 35 U.S.C. 154(b) by 83 days.

(21) Appl. No.: 15/211,511

(22) Filed: Jul. 15, 2016

(65) Prior Publication Data
US 2017/0014845 A1 Jan. 19, 2017

(30) Foreign Application Priority Data
Jul. 16, 2015 (DE) .................. 10 2015 213 422

(51) Int. Cl.
| B05B 13/04 | (2006.01) |
| B25J 11/00 | (2006.01) |
| B05D 1/02 | (2006.01) |

(52) U.S. Cl.
CPC ............ *B05B 13/0431* (2013.01); *B05D 1/02* (2013.01); *B25J 11/0075* (2013.01); *Y10S 901/43* (2013.01)

(58) Field of Classification Search
None
See application file for complete search history.

(56) References Cited

U.S. PATENT DOCUMENTS

| 3,796,376 A | 3/1974 | Farnsteiner |
| 4,301,119 A * | 11/1981 | Cobbs, Jr. ............... B05B 7/166 137/209 |
| 4,597,526 A | 7/1986 | Egli et al. |
| 5,102,051 A * | 4/1992 | Smith .................. B05B 7/0081 239/297 |
| 9,138,766 B2 | 9/2015 | Stroehlein et al. |
| 2013/0216716 A1* | 8/2013 | Strohlein ............. B05C 5/0233 427/421.1 |

FOREIGN PATENT DOCUMENTS

DE    10 2010 034 921 A1    2/2012

OTHER PUBLICATIONS

Examination Report of German Patent Office issued in Application No. 10 2015 213 422.9 dated May 25, 2016 (13 pages).

* cited by examiner

*Primary Examiner* — Nathan T Leong
(74) *Attorney, Agent, or Firm* — Flynn, Thiel, Boutell & Tanis, P.C.

(57) ABSTRACT

A robot tool for dispensing an anticorrosion wax including a nozzle unit for delivering non-atomized wax as a thin jet and wax atomized with compressed air as a spray cone. The nozzle unit is connected to a supply duct for compressed air and to a supply duct for wax, and has an internal nozzle for producing the jet and an external nozzle for producing the spray cone. An atomizing chamber is between the internal nozzle and the external nozzle, wherein the supply duct opens into the atomizing chamber. The internal nozzle is flush with the external nozzle such that, when the atomizing chamber is not supplied with compressed air, wax which exits as the jet may be delivered through the atomizing chamber and through the external nozzle. The atomizing chamber when supplied with compressed air is configured for atomizing the jet exiting from the internal nozzle by the compressed air.

2 Claims, 3 Drawing Sheets

ROBOT TOOL AND ROBOT FOR DISPENSING AN ANTICORROSION WAX, AND METHOD THEREFOR

CROSS-REFERENCE TO RELATED APPLICATION

Figure 1:
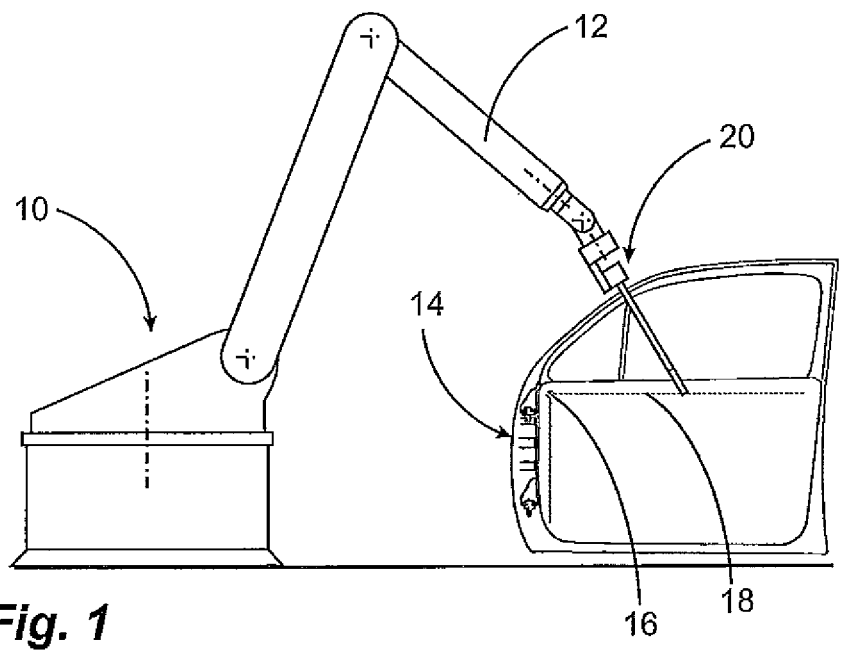

This claims priority from German Patent Application No. 10 2015 213 422.9, filed on Jul. 16, 2015, the disclosure of which is hereby incorporated by reference in its entirety into this application.

FIELD OF APPLICATION AND PRIOR ART

The invention relates to a robot tool for dispensing an anticorrosion wax, in particular for the purpose of coating body parts for motor vehicles. The invention furthermore relates to a robot for dispensing an anticorrosion wax, in particular for the purpose of coating body parts for motor vehicles and to a method for delivering an anticorrosion wax onto a preservation region of a surface to be preserved.

Robot tools for dispensing an anticorrosion wax are known in general. The present focus is on such robot tools which impinge the workpieces, in particular body parts for motor vehicles, with a jet of anticorrosion wax, the latter remaining on the respective surface portions and there avoiding corrosion during the service life of the vehicle.

In this context, two dissimilar techniques are known. In order to achieve an application in the form of narrow lines of anticorrosion wax, the anticorrosion wax is delivered in a non-atomized form by way of a nozzle of the robot tool, usually at a pressure between 3 bar and 50 bar. No mixing with air is performed such that the anticorrosion wax impacts the workpiece in the form of the comparatively thin and non-atomized jet. However, providing comparatively large areas with anticorrosion wax is problematic when such robot tools are used, since it is time-consuming for these areas to be filled by narrow lines of anticorrosion-wax.

Other robot tools which are configured for atomizing the anticorrosion wax in the region of the nozzle of the robot tools are usually used for the planar application of anticorrosion wax on workpieces. In the case of these robot tools a mixing chamber, into which the anticorrosion wax and compressed air are introduced such that a mixture of liquid and air results which is supplied to the delivery nozzle, is usually provided so as to be remote from the delivery nozzle and to be connected to the latter by way of lines. A cone-shaped spray jet of atomized anticorrosion wax, which permits rapid planar application of anticorrosion wax, is created at this delivery nozzle.

These previously conventional robot tools are particularly suitable when the corresponding workpieces require application exclusively in the form of narrow lines or application exclusively in planar form. If both line-shaped and planar application regions are provided on the same workplace, the previous robot tools are not ideally suited herefor. Either a robot tool provided for non-atomized delivery must simultaneously trace planar regions by line-shaped application of the anticorrosion wax, or the robot tool must be exchanged. Both solutions are disadvantageous for desired cycle times in the field of automobiles.

OBJECT AND ACHIEVEMENT

It is an object of the invention to provide a method and a robot tool which enable short cycle times and flexible forms of delivery for dispensing the anticorrosion wax.

The object is achieved by a robot tool.

The robot tool comprises a nozzle unit which is configured for the selective delivery in a delivery direction of non-atomized anticorrosion wax in the form of a thin jet, and of anticorrosion wax atomized with compressed air, in the form of a spray cone.

The nozzle unit is connected to a supply duct for compressed air, and to a supply duct for anticorrosion wax. Said nozzle unit has an internal nozzle for producing a jet of anticorrosion wax, wherein the internal nozzle is supplied by way of the supply duct for anticorrosion wax. Said nozzle unit furthermore has an external nozzle for producing a spray cone of atomized anticorrosion wax. An atomizing chamber is provided between the internal nozzle and the external nozzle, wherein the supply duct for the compressed air opens into the atomizing chamber.

The internal nozzle in the delivery direction is aligned so as to be flush with the external nozzle such that, when the atomizing chamber is not supplied with compressed air, anticorrosion wax which exits in the form of a jet by way of the internal nozzle may be delivered as a jet through the atomizing chamber and through the external nozzle.

The atomizing chamber, when the atomizing chamber is supplied with compressed air, is configured for atomizing the jet exiting from the internal nozzle by way of the supplied compressed air.

The robot tool according to the invention is configured for dispensing both anticorrosion wax in a non-atomized form in order to achieve narrow applications of anticorrosion wax, as well as to permit atomized dispensing of the anticorrosion wax with the aid of compressed air.

This nozzle unit by way of the supply ducts may be supplied with anticorrosion wax and compressed air. If and when only anticorrosion wax but not compressed air is supplied, delivery is performed in the form of a non-atomized thin jet. If and when compressed air is additionally supplied, atomizing and delivery of the anticorrosion wax in the form of a spray cone of compressed air and atomized anticorrosion wax is performed.

To this end, the nozzle unit disposes of the two mentioned nozzles, specifically the internal nozzle and the external nozzle. These two nozzles are aligned so as to be mutually flush. If and when no compressed air is supplied to the nozzle unit, the internal nozzle produces the non-atomized jet of anticorrosion wax, which by virtue of the flush arrangement is delivered in an unimpeded manner through the atomizing chamber and through the external nozzle. If and when compressed air is supplied to the nozzle unit, the jet which is delivered by way of the internal nozzle is swirled and atomized in the atomizing chamber, being dispensed in the form of the mentioned spray cone by way of the external nozzle.

Switching may take place between these two types of delivery, by activating and de-activating the supply of compressed air. Additionally, it may be expedient for the pressure at which the anticorrosion wax is supplied, to also be adapted for the respective type of delivery.

The robot tool according to the invention is thus suitable to provide workpieces in portions with anticorrosion wax in the form of lines, and in portions in a planar manner, at short cycle times. Changeover times between robot tools are thus dispensed with.

The internal nozzle and the external nozzle may be variably spaced apart from one another, wherein the volume of the atomizing chamber is enlargeable by enlarging the spacing.

By way of the variable spacing of the internal nozzle and the external nozzle it is possible for this spacing to be adapted to the respective operating mode chosen. If the line-shaped delivery is desired, the internal nozzle and the external nozzle should be close together such that the jet which is delivered by way of the internal nozzle is not negatively influenced by the external nozzle. If a planar delivery of atomized anticorrosion wax is to be performed, an enlargement of this spacing is desirable so that, on account thereof, the atomizing chamber is also enlarged and a more homogenous mixture of air and anticorrosion wax may thus be produced.

By way of the variable spacing, the nozzle unit may be configured so as to be ideal for the two operating modes.

The internal nozzle and the external nozzle by way of a nozzle spring may be permanently impinged in relation to one another by a force. The internal nozzle and the external nozzle by supplying compressed air may furthermore be impingeable away from one another by a force.

Alternatively to such a design, it is indeed also possible for the mutual displacement of the internal nozzle and of the external nozzle to be effected by way of a linear actuator or the like.

However, a design in which the compressed air per se leads to the minor spacing between the internal nozzle and the external nozzle in the standby position being increased is advantageous. By way of the nozzle spring a spring force is continuously effected here in the direction of a convergence of the internal nozzle and the external nozzle. It is only the compressed air that mutually traverses the internal nozzle and the external nozzle, leading on account thereof to the desired enlarged atomizing chamber. If and when the compressed air supply is cut off, the nozzle spring is again active, reducing the size of the atomizing chamber such that a completely unimpeded delivery of the non-atomized jet of anticorrosion wax is again delivered.

The nozzle unit may have two functional groups, specifically an internal-nozzle functional group, and an external-nozzle functional group, which are movable in relation to one another. The internal-nozzle functional group here may comprise at least one duct portion of the supply duct for anticorrosion wax leading to the internal nozzle, and the internal nozzle. The external-nozzle functional group may comprise at least one jacket wall which surrounds the atomizing chamber, and the external nozzle. The internal-nozzle functional group and the external-nozzle functional group may be mounted on one another so as to be traversable in the delivery direction.

This type of construction has been demonstrated as being very reliable and simple in terms of construction. The functional group which contains the internal nozzle here is surrounded by that functional group that contains the external nozzle and that additionally provides a jacket wall which surrounds the atomizing chamber. The mentioned nozzle spring acts between the two functional groups, urging them towards one another.

The supply duct for compressed air, and the supply duct for anticorrosion wax, in relation to the cross section, may at least in portions be configured as concentrically disposed supply ducts. The supply duct for the anticorrosion wax here may be internally disposed, and the supply duct for the compressed air may be externally disposed. These supply ducts may in this way transition directly to the mentioned nozzle unit having the internal-nozzle functional group and the external-nozzle functional group. It is of particular advantage here for the internal-nozzle functional group in relation to the walls of the supply ducts, which in particular may be formed by two concentric tubes, to be provided in a locationally fixed manner.

The object is also achieved by a robot for dispensing an anticorrosion wax, in particular for the purpose of coating body parts for motor vehicles.

The robot includes a robotic arm and, attached thereto, a robot tool of the type described.

The robot is controlled by a controller installation which, apart from the motion sequences of the robot, also controls the supply of compressed air. On account thereof, the respectively desired operating mode, that is to say the delivery of non-atomized anticorrosion wax and the delivery of atomized anticorrosion wax, is controlled. The pressure at which the anticorrosion wax is supplied may also be adjustable by the controller installation, so as to enable the respective pressure which is ideal for the two operating modes.

The object is also achieved by a method for delivering anticorrosion wax onto preservation regions of a surface to be preserved.

The delivery here is performed by means of a robot tool of the type described.

The delivery for coating at least one first preservation region is performed in the form of a non-atomized jet of anticorrosion wax, and for coating at least one second preservation region in the form of anticorrosion wax which is atomized by means of compressed air. The two operating modes of the tool described are used to this end.

The delivery of the anticorrosion wax in the case of a non-atomized delivery here is preferably performed at a pressure between 3 bar and 50 bar. However, pressures up to 120 bar are also possible. For the purpose of the atomized delivery, the anticorrosion wax preferably exits from the internal nozzle at between 80 bar and 120 bar.

The method is used in particular for body parts of motor vehicles, such as vehicle doors, for example. Short cycle times and ideally adapted forms of the delivery in an atomized and non-atomized form may be implemented by using the robot tool described.

BRIEF DESCRIPTION OF THE DRAWINGS

Further advantages and aspects of the invention are derived from the claims and from the following description of preferred exemplary embodiments of the invention, which are explained by means of the figures in which:

FIG. 1 shows a robot having a robot tool for dispensing an anticorrosion wax;

FIG. 2 shows the robot tool of the robot according to FIG. 1, in a separate illustration;

FIG. 3 shows the nozzle unit of the robot tool of FIG. 2, in an exploded illustration;

FIGS. 4*a* and 4*b* show the nozzle unit of the robot tool in two different operating modes; and FIG. 5 shows an alternative design of a nozzle unit.

DETAILED DESCRIPTION OF THE EXEMPLARY EMBODIMENTS

FIG. 1 shows a robot tool according to the invention during use. This robot tool 20 is provided on the robotic arm 12 of a robot 10, and by way of lines in a manner which cannot be derived from FIG. 1, is provided with anticorrosion wax and compressed air. Said robot tool 20 serves the purpose of providing a workpiece, presently a car door 14, with anticorrosion wax.

Various regions on the car door 14, which are to be provided with anticorrosion wax, are illustrated in an exemplary manner with dashed lines. These regions comprise a planar region 16 of a few cm in diameter, and linear regions 18 where anticorrosion wax is to be delivered only in the form of comparatively narrow lines.

In the case of requirements of this type it is expedient for the anticorrosion wax in the case of the region 16 to be delivered in a manner atomized by compressed air, so as to be able to provide planar regions with anticorrosion wax at high speed, while the narrow linear regions 18 are preferably to be provided with non-atomized anticorrosion wax.

The robot tool 20 is configured to be able to provide both planar regions 16 as well as linear regions 18 with anticorrosion wax, without necessitating comparatively long retooling times.

Figure 2:
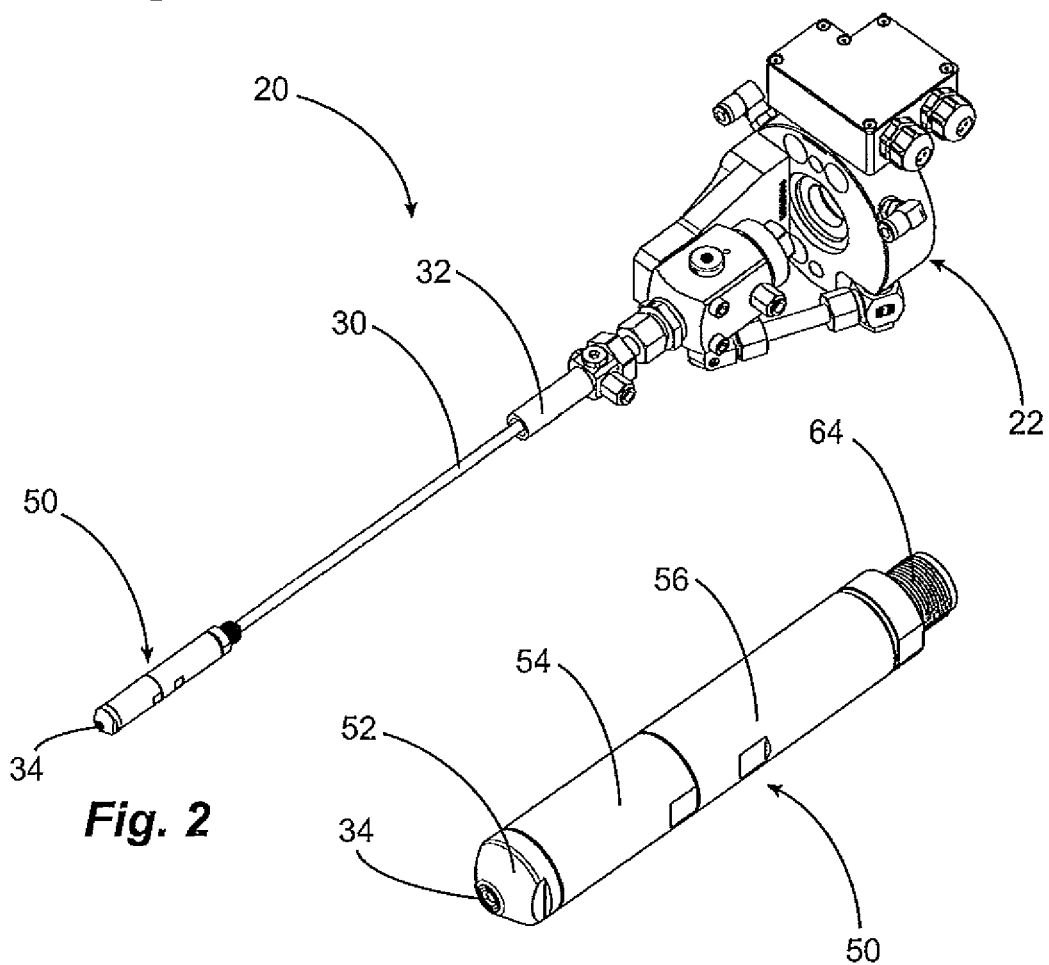

FIG. 2 shows the robot tool 20 in a detailed view, wherein a nozzle unit 50 is also separately illustrated in an enlarged manner.

The robot tool 20 includes a base 22 which is provided with a coupling installation for coupling to the robot arm 12. In a manner not illustrated in more detail, connectors for providing the robot tool 20 with compressed air and anticorrosion wax are also provided in the region of the base 22.

The robot tool 20 includes the already mentioned nozzle unit 50 having a delivery opening 34 which simultaneously is the outlet side of an external nozzle 53 which is yet to be described hereunder. The nozzle unit 50, by way of two concentric pipes 30, 32, is connected to the base 22, the external pipe 32 in FIG. 2 for reasons of clarity being partially omitted. The internal pipe 30 makes available an internal supply duct 72 for anticorrosion wax. The annular space between the internal pipe 30 and the external pipe 32 furthermore makes available a supply duct 70 for compressed air. The nozzle unit 50 may be supplied with anticorrosion wax and compressed air in this manner.

The nozzle unit 50 comprises two functional groups which are movable in relation to one another, specifically an internal-nozzle functional group and an external-nozzle functional group, which are guided so as to slide along one another. Referring to FIG. 2, the internal-nozzle functional group may only be identified by way of the connector part 64. The external-nozzle component 52, the atomizing-chamber wall 54, and a sleeve component 56 which adjoins the former, are part of the external-nozzle functional group.

Figure 3:
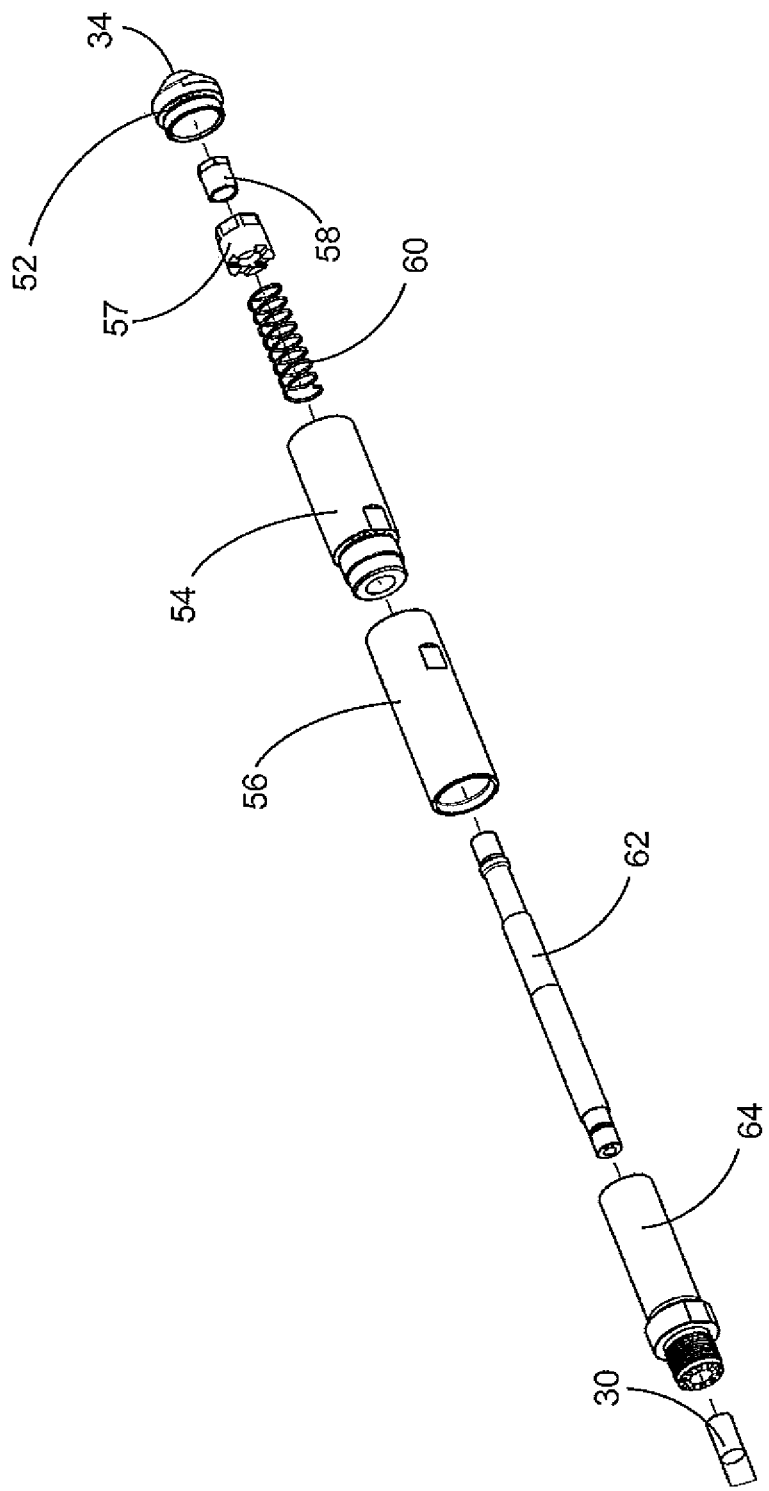

The entirety of the components may be seen by means of the exploded illustration of FIG. 3. The external pipe 32 and the internal pipe 30 are connected to the mentioned connector piece 64. A duct component 62 is provided so as to be locationally fixed to said connector piece 64. Said duct component 62 in turn by way of an intermediate component 57 is fixedly connected to an internal-nozzle component 58, the latter in turn having the internal nozzle 59. The external-nozzle functional group comprises the end-side external-nozzle component 52 having the external nozzle 53 provided therein. Said external-nozzle component 52 in the assembled state is fixedly connected to the atomizing-chamber wall 54 and to the sleeve component 56.

Figure 4A:
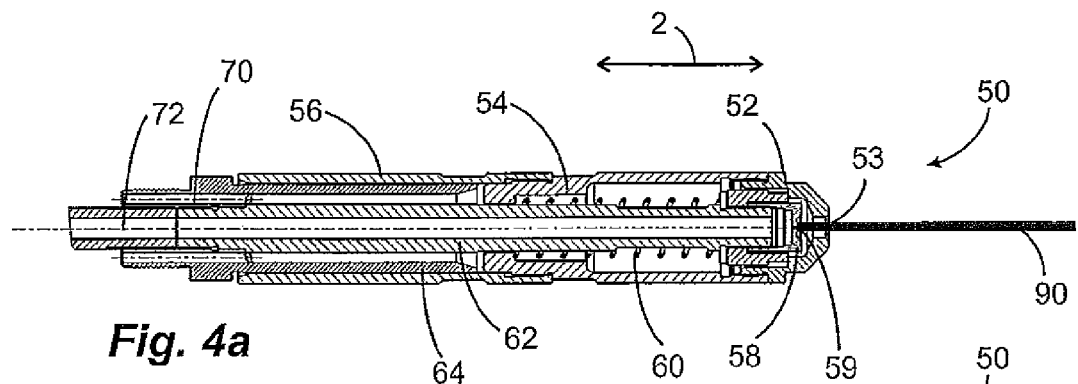
Figure 4B:
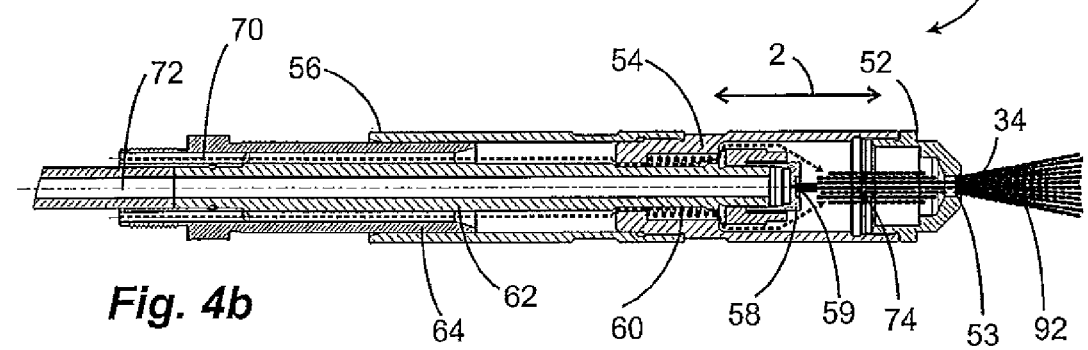

As is likewise elucidated in FIGS. 4a and 4b, the nozzle spring 60 is supported on a stop of the atomizing-chamber wall 54, on the one hand, and on the intermediate component 57, on the other hand, thus effecting a permanent impingement of the functional groups with a force.

FIGS. 4a and 4b show the nozzle unit during operation, FIG. 4a showing that operating mode in which no compressed air is supplied and the anticorrosion wax is dispensed in the form of a thin non-atomized jet 90. FIG. 4b shows the second operating mode in which, additionally to the anticorrosion wax, compressed air which atomizes the anticorrosion wax and produces a spray cone 92 of atomized anticorrosion wax is also supplied.

In the first operating mode which is illustrated in FIG. 4a, only anticorrosion wax is supplied in the manner already described by way of the supply duct 72 which is provided within the internal pipe 30 and the pipe portion 62. In this way, the anticorrosion wax makes its way up to the internal-nozzle component 58 and to the internal nozzle 59 therein. Said anticorrosion wax is dispensed in the form of a jet which traverses the external nozzle 53, without the external nozzle 53 having any influence on the delivery characteristics. In this operating mode the anticorrosion wax may be applied in the form of fine lines onto the workpiece, that is to say in the regions 18 in terms of the car door of FIG. 1.

The second operating mode which is illustrated in FIG. 4b, in terms of the supply of the anticorrosion wax by way of the supply duct 72, is identical. However, the protective wax, which is dispensed in the form of a jet by way of the internal nozzle 59, first makes its way into the atomizing chamber 74. This atomizing chamber 74 in the second operating mode is substantially larger than in the first operating mode. This is achieved by supplying compressed air at a pressure of 2 bar to 6 bar. This compressed air urges the external functional group, and with it the external nozzle 53, counter to the force of the nozzle spring 60, to the right in terms of the illustration. The thus significantly enlarged atomizing chamber 74 permits complete atomization, leading to a very homogenous mixture of air and liquid, which is dispensed as a cone-shaped and atomized spray jet 92. As soon as the supply of compressed air by way of the supply duct 70 is cut off, the nozzle unit 50 is converted back to the first operating mode thereof according to FIG. 4a.

Figure 5:
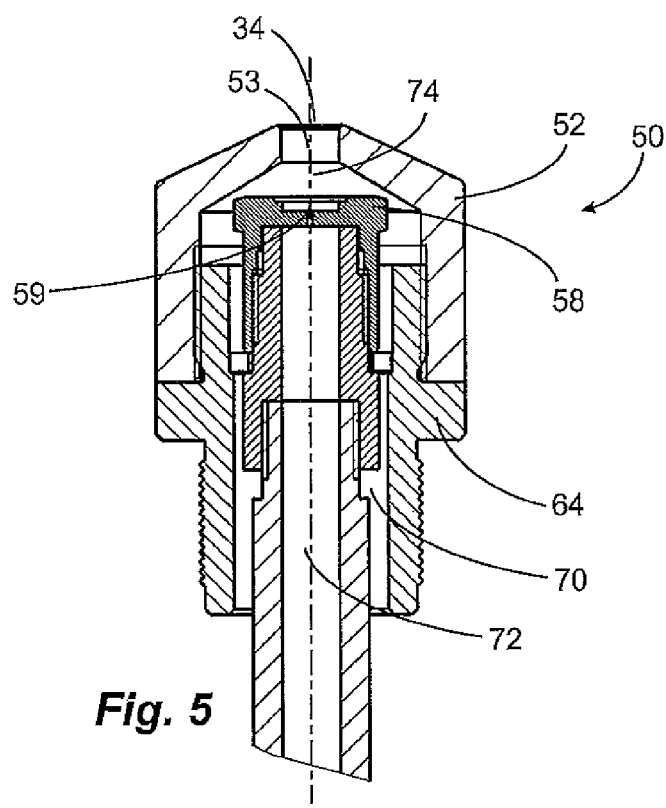

FIG. 5 shows an alternative design of the nozzle unit 50. The functional principle here is identical to the extent that an internal nozzle 59 and an external nozzle 53 are also provided in the case of this design, wherein the non-atomized spray jet which is delivered by way of the internal nozzle 59 in the case of anticorrosion wax being supplied without a supply of compressed air, may also be dispensed without being influenced by way of the external nozzle 53. If and when compressed air is additionally supplied by way of the supply duct 70, atomizing again arises in the region of the atomizing chamber 74, and delivery of anticorrosion wax in a form atomized by the compressed air is thus performed.

The difference between the design embodiment of FIG. 5 and the design embodiment according to FIGS. 2 to 4b thus primarily lies in that the atomizing chamber 74 according to FIG. 5 does not have a variable volume. The type of construction according to FIG. 5, while indeed being considered as disadvantageous, is however of simpler construction, thus having its right to exist.

The invention claimed is:

1. A method for delivering anticorrosion wax onto preservation regions of a surface to be preserved, wherein:
    delivery is performed by a robot tool, the robot tool comprising a nozzle unit configured for the selective delivery in a delivery direction of non-atomized anticorrosion wax in the form of a thin jet, and of anticorrosion wax atomized with compressed air in the form of a spray cone, the nozzle unit being connected to a supply duct for compressed air and to a supply duct for anticorrosion wax, the nozzle unit having an internal nozzle for producing a jet of anticorrosion wax, the internal nozzle being supplied by way of the supply duct for anticorrosion wax, the nozzle unit having an external nozzle for producing a spray cone of atomized anticorrosion wax, an atomizing chamber being provided between the internal nozzle and the external nozzle, the supply duct for the compressed air opening into the atomizing chamber, the internal nozzle in the delivery direction being aligned so as to be flush with the external nozzle such that, when the atomizing chamber is not supplied with compressed air, anticorrosion wax which exits in the form of a jet by way of the internal nozzle may be delivered as a jet through the atomizing chamber and through the external nozzle, and the atomizing chamber, when the atomizing chamber is supplied with compressed air, being configured for atomizing the jet exiting from the internal nozzle by way of the supplied compressed air;

delivery for coating at least one first preservation region is performed in the form of a non-atomized jet of anticorrosion wax; and delivery for coating at least one second preservation region is performed in the form of a spray cone having anticorrosion wax which is atomized by means of compressed air.

2. The method according to claim 1, wherein a pressure at which the anticorrosion wax is supplied, directly beyond the internal nozzle, is between 80 bar and 120 bar.

* * * * *